United States Patent

Schramm et al.

[15] 3,703,016

[45] Nov. 21, 1972

[54] TRAVERSING BRIDGE FRICTION DRIVE ALIGNMENT CONTROL

[72] Inventors: Lester H. Schramm; John B. Rank, both of Milwaukee; Melvin R. Salkeld, Brookfield, all of Wis.

[73] Assignee: Rex Chainbelt Inc., Milwaukee, Wis.

[22] Filed: Oct. 19, 1970

[21] Appl. No.: 81,718

[52] U.S. Cl. ...................15/246.5, 15/93, 105/61, 105/163 SK, 212/21
[51] Int. Cl......B61d 15/00, B66c 17/26, F22b 37/48
[58] Field of Search ..........15/246.5, 93; 104/50, 98; 105/61, 163 R, 163 SK; 212/18, 21, 22

[56] References Cited

UNITED STATES PATENTS

| | | | |
|---|---|---|---|
| 3,362,039 | 1/1968 | Bahr | 15/246.5 |
| 3,095,829 | 7/1963 | Dehn | 105/163 R |
| 1,181,300 | 5/1916 | Foote | 105/61 |
| 1,181,324 | 5/1916 | Lent | 105/61 |
| 1,882,325 | 10/1932 | Kendall et al. | 105/163 R |
| 2,601,831 | 7/1952 | Caillard | 104/50 |
| 3,473,185 | 10/1949 | Bahr | 15/246.5 |

*Primary Examiner*—Gerald M. Forlenza
*Assistant Examiner*—Howard Beltran
*Attorney*—Ernst W. Schultz and Joseph J. Jochman, Jr.

[57] ABSTRACT

Four wheels support a travelling bridge on parallel rails. One wheel at each end is driven by a motor and the power supply driving each motor is separately adjustable. The other two wheels are cylindrical and of the same nominal size and are journalled so that they roll freely in supporting the bridge on the rails.

Relative rotation of the two cylindrical wheels indicating bridge misalignment adjusts the two power supplies to correct such misalignment. If the misalignment of skewing is due to an off-centered load encountered by the bridge, the corresponding adjustments of the torque outputs of the motors compensate for such a load. If the overload is too great, the increased skew angle will then reach the limits which shut off the power supply.

7 Claims, 2 Drawing Figures

PATENTED NOV 21 1972

3,703,016

TRAVERSING BRIDGE FRICTION DRIVE ALIGNMENT CONTROL

BACKGROUND OF THE INVENTION

The present invention was developed for the scraping and skimming apparatus of extra wide rectangular water treatment tanks. Such apparatus is carried for reciprocation by a bridge which extends over the width of the tank and moves the length of the tank. The bridge considered by itself moves sidewardly. However, the scraping and skimming are generally in opposite directions respectively referred to as the forward and return directions.

In such tanks, a heavy object or settled material which has accumulated nearer one side or the other of the tank may present to the bridge a considerable off-centered load or resistance to its movement. The drive and support means for the bridge must be able to overcome such loads and maintain the bridge in alignment as it pushes the object or the material toward one end of the tank, or must be sufficiently responsive to shut off the power supply so that structural damage is avoided.

The wheels of a short-span bridge are provided with flanges for limiting misalignment of the bridge, that is, so the bridge is always relatively normal, or at right angles, to the rails. Short-span bridges have a distance between rails which is a small number of times the distance between the two wheels supporting each end of the bridge. The flanges of the four wheels will maintain such alignment adequately, as well as keep the bridge centered or on the rails.

In the design of a bridge for a very wide tank, flanges are provided, of course, to keep the wheels on the rails, but they allow too much skewing and other positive means for keeping the bridge aligned also must be provided. Such means may be direct operating cog wheels or linear sensing devices such as tape lines operating on reels.

None of these means are entirely satisfactory for all seasons, especially under winter icing conditions. Also, a drive shaft having to extend the length of a bridge in the order of 100 feet is itself a considerable complication as well as having weight and cost.

SUMMARY OF THE INVENTION

It has been found that cylindrical wheels carrying the partial weight of a long narrow bridge and rolling freely on parallel steel rails will dependably maintain their angular relationship almost indefinitely despite the corrections involved in maintaining bridge alignment. This allows such wheels to be used to determine the degree of bridge alignment or misalignment and to effect corresponding corrections by a suitable servo-system which controls the drives of the other wheels and requires only the control conductors to extend from the remote end of the bridge to the control station.

The weight of the bridge is utilized to overcome obstructions such as ice on the rails. An actual obstruction such as a metal bar across a rail will, of course, effect an angular displacement of the wheels and immediately shut down the operation of the bridge.

DESCRIPTION OF THE PREFERRED EMBODIMENT

Figure 1:
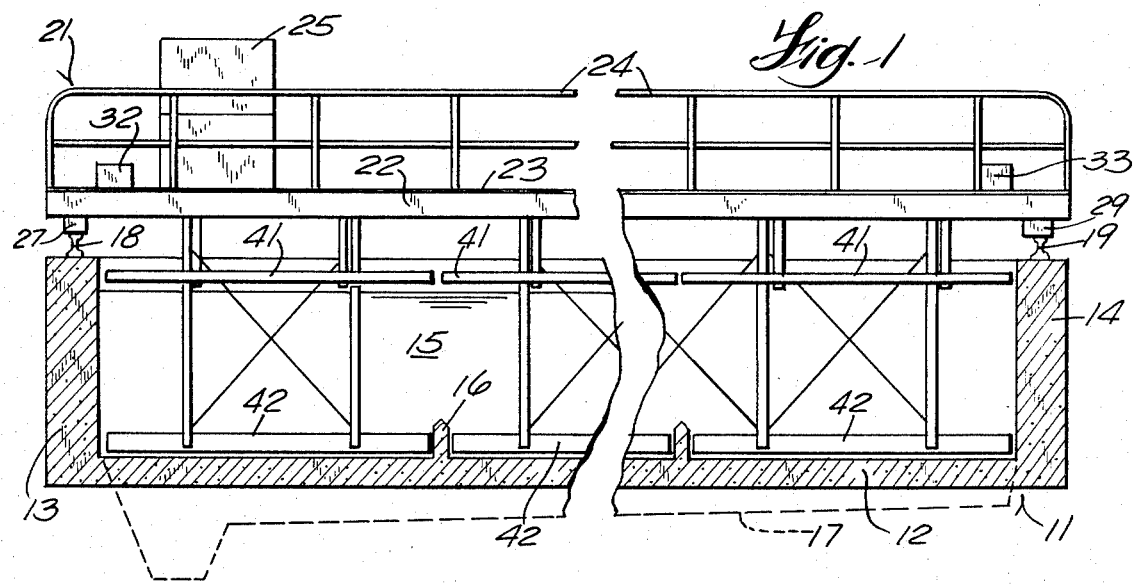
FIG. 1 shows the cross-section of a typical tank of concrete construction and the rear elevation of the bridge. Because of the width of the tank, the figure is broken and a large central section is omitted.

The tank 11 shown in section, is rectangular in plan and is approximately 100 feet wide and 200 feet long. The tank includes the bottom 12, the parallel sidewalls 13 and 14 and the end wall 15 which is provided with the tank inlet, not shown. The opposite end wall, the scum receiving trough extending alongside the latter and the submerged tank outlet, are also not shown. The outlet may be an overflow launder which then serves also to maintain a given liquid level within the tank.

The upright divider 16 is one of several which extend parallel to the tank walls and divide the floor of the tank into five twenty-foot wide settling zones. Bottom 12 may have a slight slope downwardly to the sludge receiving hopper 17 denoted by broken lines and located adjacent to end wall 15.

The two parallel rails 18 and 19 for the support of the bridge are fixed to the top sides of walls 13 and 14 and extend the length of the tank. Bridge 21 includes the frame 22 comprising parallel beams which are joined together and support the deck 23 for the operator's walkway between guard rails 24 to and from the control station 25.

Figure 2:
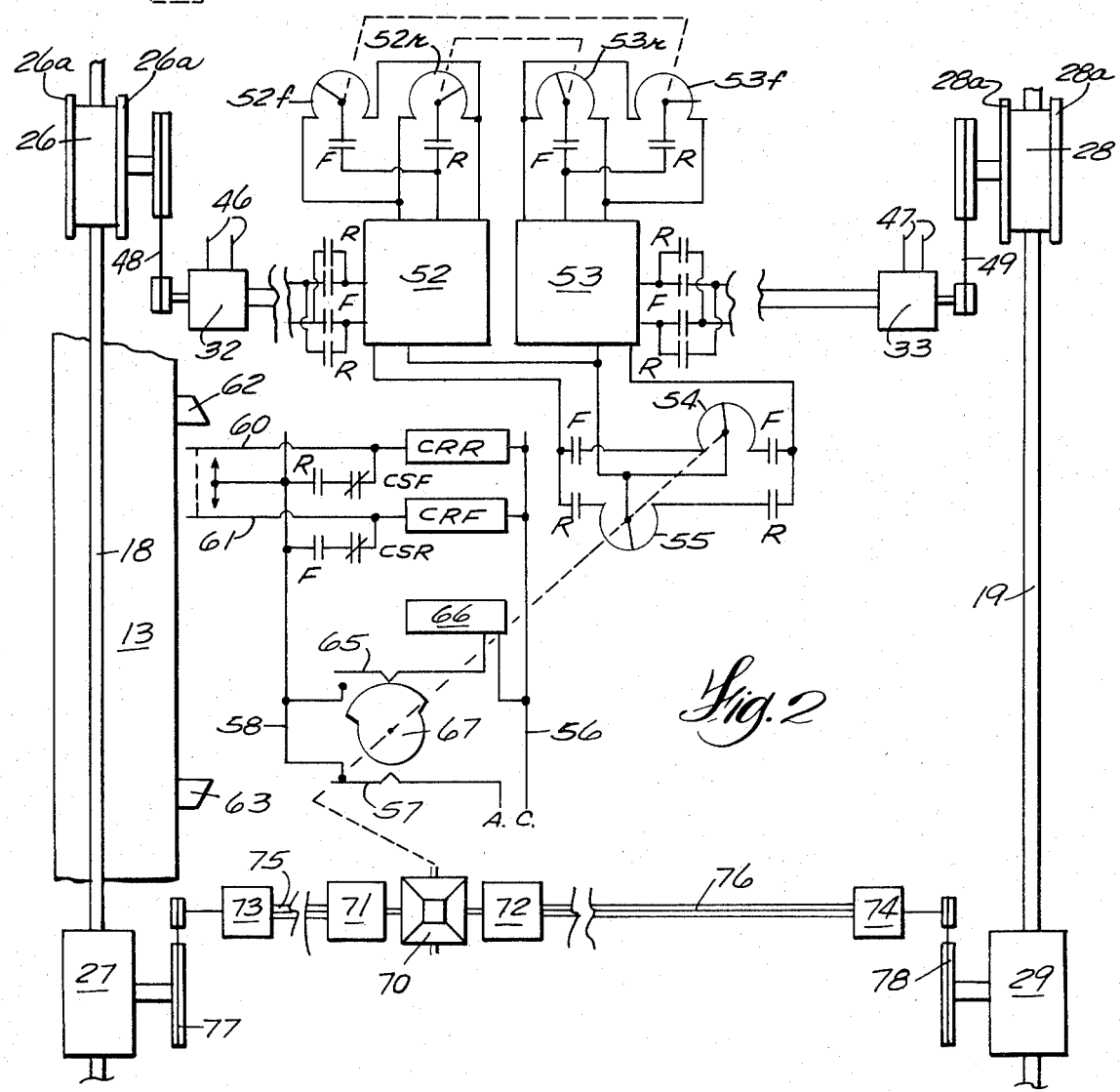
FIG. 2 shows the control system diagrammatically and includes the related operative parts and supporting wheels of the bridge.

The steel wheels 26 and 27 which support one end of bridge 21 on rail 18 and the wheels 28 and 29 which support the other end on rail 19 are shown in FIG. 2. The wheels are fixed on axles which are journaled in suitable bearings of the bridge frame 22 in a conventional manner. The total wheel load of the bridge is approximately 30,000 pounds.

The forward drive wheels 26 and 28 are six inches wide between flanges 26a and 28a and are driven by electric motors 32 and 33 mounted on the bridge adjacent the corresponding wheels. The electric power for the operations of the bridge may be variously provided such as by a cable which is reeled and unreeled as the bridge moves toward and away from its terminal at one end of the tank.

The several skimming and scraping blades 41 and 42 are suitably carried below bridge 21 with means to raise and lower the blades as required. Blades 41 as shown are in the elevated position above the waterlevel of the tank.

The scraping blades 42 as shown are in their lower scraping position on or immediately above the floor of the tank and between the side walls and dividers 16. Suitable actuating means, not shown, are provided for raising the blades for the return travel of the bridge. The blades 41 and 42 are generally segmented as shown so that they may comprise individually replaceable and operable sections and such that any damage thereto or malfunction is generally limited to one such section.

As shown in FIG. 2 of the drawing, the chain drives 48 and 49 connect motors 32 and 33 and the drive wheels 26 and 28. Motors 32 and 33 are low-slip variable speed D.C. motors of one horsepower each. The motors have integral reduction gears which with the chain drives provide the desired speed and output torque. The speed range is approximately three feet per minute in the scraping direction and six feet per minute in the reverse skimming direction. The output torque is normally that required to provide the 1200 lbs. tractive effort required to move each end of the bridge under normal conditions.

The leads 46 and 47 of the motor provide for connection to the fixed-current field windings of the motor. The armature leads of motors 32 and 33 are connected through the relay controlled switches F and R to the variable D.C. rectifiers 52 and 53. The arrangement of these switches provides for reversal of the currents to reverse the direction of the motors and they are controlled respectively by relays CRF and CRR as will be described.

Each voltage controller is of the silicon controlled rectifier type wherein a firing circuit limits the conductance of the diodes and the firing circuit conductance is adjustable to vary the voltage output. The firing circuit of rectifier 52 includes the control potentiometers 52f and 52r which are connected in parallel. Their center taps, however, are respectively connected in the circuit through relay controlled switches F and R so that only one or the other potentiometer is operable to control the output voltage. The firing circuit of rectifier 53 similarly includes potentiometers 53f and r and additionally includes the variable bias resistors or potentiometers 54 and 55 which alternatively provide adjustment of the selected voltage output of the rectifier. For that purpose the two ground leads of the rectifiers are together connected to the potentiometer wipers. The opposite ends of potentiometer 54 are connected by switches F to the two rectifiers 52 and 53 and the opposite ends of potentiometer 55 are similarly connected to the rectifiers by switches R. It should be noted that the two potentiometers are electrically reversed as will be explained.

Various means may be provided for effecting the operation and reciprocating travel of the bridge. The means shown is simplified for illustrative purposes and in particular does not include the actuating means and control for the blades 41 and 42. The control voltage supply is connected directly to line 56 and through cut-off switch 57 to line 58.

The control relay CRR, and limit switch 60 are connected in series to the control voltage supply lines 56 and 58; similarly, control relay CRF, and limit switch 61 are connected in series to lines 56 and 58. The normally open single pole switches 60 and 61 are carried by bridge 21 so that they engage respectively the abutments 62 and 63 which are carried by side wall 13 of tank 11 at the respective ends thereof.

The normally closed relay operated switch CSF is connected in series with a normally open switch R, and the normally closed relay operated switch CSR is connected in series with a normally open switch F, and these two series circuits are connected in shunt across the two switches 60 and 61, respectively. Additionally, switch 65 and alarm 66 are connected in series to lines 56 and 58 so that with rotation of wheel 67 its lobe closes switch 57 and is first effective to operate the alarm as will be described, and thereafter open cut-off switch 57.

In the operation of the bridge in the forward direction CSR switch is normally closed, all switches F are closed by relay CRF, switch CSF is opened by relay CRF, and all others are normally open, and the settings of potentiometers 52f and 53f determine the forward speed of the bridge.

As the bridge approaches the end wall 15, switch 60 is momentarily closed by abutment 62 and control relay CRR is energized. This opens switch CSR and deenergizes control relay CRF which in turn opens all F switches. At this moment all circuits are open and thereupon all R switches are closed to reconnect the motors 32 and 33 and then drive the bridge in the reverse direction at whatever speed is determined by the settings of potentiometers 52r and 53r.

Similarly, as switch 61 engages abutment 63 all R switches are opened and F switches are closed for another reversal of the bridge. Appropriate time delays must, of course, be provided in the described switching operations.

According to the present invention, alignment of bridge 21 is maintained by the relative rotation of the cylindrical control wheels 27 and 29 which occurs with any angular movement of bridge 21. For that purpose, the shafts of potentiometers 54 and 55 are connected to the single output shaft of the gear differential 70 and the two input shafts of differential 70 are driven by motors 71 and 72. Motors 71 and 72 are remotely driven or controlled by the signal generators 73 and 74 to which they are connected by cables 75 and 76. Generators 73 and 74 are located near wheels 27 and 29 and are driven through suitable gearing or the chain drives 77 and 78 so that each rotation of wheels 27 and 29 in the same direction effects a certain number of opposite rotations of the inputs of differential 70. Conversely, any difference in such rotation of wheels 27 and 29 effects a rotation of the output of differential 70 and effects the rotation of the shafts of potentiometers 54 and 55. Cam wheel 67 is also connected to the output shaft of differential 70.

For the initial adjustment of bridge 21 which is required, the bridge must be set square to the rails 18 and 19 by manual start and stop control of motors 32 and 33 and by measurement. The wheel 67 and potentiometers 54 and 55 are then reset if necessary near their midpoints in any convenient manner, such as by manually overriding their coupling to differential 70. Thereafter potentiometers 52f and 53f are adjusted to provide the desired rate of travel of the bridge in the scraping direction toward hopper 17.

Such initial adjustment might require another adjustment of potentiometer 54 until the potentiometers 52f and 53f are set so that the speed of travel of the ends of bridge 21 are nominally equal. This may be determined by observing the rotation of the output of differential 70 and in turn confirmed by measurement of the bridge and finding that it is still square to the rails.

The adjustments may, of course, require some number of traversals of the bridge and while the bridge is travelling in the skimming direction, similar adjustments of potentiometers 52r, 53r and 55 are to be effected.

It has been mentioned that potentiometers 54 and 55 are oppositely arranged so that rotation of the output of differential 70 increases the value of one and decreases that of the other. The need for such arrange-ment is explained by noting that if in both directions the end of bridge 21 on rail 18 is faster than the other end, the same electrical adjustments of rectifiers 52 and 53 are required in each direction of travel. In actuality, however, the rotational direction of the output of differential 70 will reverse. The opposite arrangements of potentiometers 54 and 55 effects the necessary second reversal.

When the bridge encounters a normal off-centered load, for example at the left rear wall 13 and in the scraping direction, motor 32 will be slowed to some lower speed where its torque output again equals the load. The slowing of motor 32 results in a comparable skewing of bridge 21 and the corresponding relative rotation of wheels 27 and 29 and inputs of differential 70 effects a corresponding adjustment of potentiometer 54 which increases the voltage supply to motor 32 and lowers that of motor 33. If the overload is some heavier material which can be moved to hopper 17, bridge 21 will continue to move at its skew angle until reaching hopper 17.

As shown, the drive wheels 26 and 28 only are provided with flanges on both sides of the rails. Wheels 27 and 29 are somewhat wider than wheels 26 and 28 and do not require flanges except that they may be provided merely as an extra precaution.

Very possibly, the skew angle might be great enough to turn wheel 67 just enough to close switch 65 and sound the alarm 66 but not open switch 57 which would shut off the control voltage and open all switches F and R.

As the material falls into the hopper and the overload is discountinued, motor 32 will run at some speed faster than motor 33 until bridge 21 has been realigned and until the reverse rotation of potentiometer 54 has reset the motors to their original speeds.

An overload in the reverse direction is generally unlikely, but might occur, for example, in the event some structural part of the bridge or its mechanism becomes loose.

Assuming, for example, that some obstruction near wall 14 is encountered by the skimming blade in its lowered position, the reduced speed of motor 33 or the slippage of wheel 28 on rail 19 would allow the other end of the bridge on rail 18 to move so far forward that the wheel 67 would be almost immediately turned to open switch 57 while the alarm is sounding.

Motors 32 and 33 are operated under normal conditions at about 75 percent of their rated maximum which allows a more than adequate margin for the lower and higher speeds which may be desired as well as the torque increase required of the "overloaded" motor.

FIG. 2 shows diagrammatically, complementary adjustment of both motors in each direction. Obviously therefrom, the speed of one motor alone may be raised or lowered as required or the speed of either motor may be lowered to match the overload. In the latter case, the margin referred to for the torque increase is not required. In each case it should be noted that the angularity of the bridge is not corrected by the overload condition, but only adjusts the torque outputs of the motor to correspond with the overload condition, within limits.

The bridge with which the invention has been applied was adjusted when placed in operation and has operated eleven months without requiring additional adjustment. Such operation was continuous and the traversing of the tank on an average of 1½ times per hour is considered notable in that after the innumerable speed adjustments and course corrections which were made, there has been no detectable relative rotation of the cylindrical control wheels 27 and 29.

We claim:
1. In a gravity separation tank having parallel rails along each side for a reciprocating bridge carrying blades for pushing separated material in one direction, the improvement comprising:
   a. A bridge having four wheels, two at each end thereof, for operation on said rails;
      i. One of said wheels at each end being driven, and
      ii. The other of said wheels at each end being non-driven;
   b. Two adjustable non-synchronous drive means each for driving a different one of said driven wheels;
   c. Differential means having two inputs coupled to said non-driven wheels and having an output; and
   d. Control means responsive to the output of said differential means for controlling at least one of said adjustable drive means, so that the degree of the skew of the said bridge due to an off-centered load is indicated by the relative rotation of said non-driven wheels and effects the relative adjustment of said two drive means to reduce the skew and align the bridge with the rails of the tank.

2. The invention of claim 1, wherein said control means com-prises limit switch means operable to disable said drive means when the skew exceeds a predetermined degree.

3. The invention of claim 2, wherein said limit switch means comprises a cam-operated switch and a cam driven by the output of said differential means for operating said switch.

4. The invention of claim 1, wherein said drive means are reversible, and said control means comprises means for reversing the direction of said drive means and for controlling the speed of said drive means in each direction, thereby providing for different reciprocating speeds of said bridge.

5. In combination with a traveling bridge supported on spaced parallel rails by a pair of spaced wheels at each end of the bridge, one wheel of each pair being driven by a separate adjustable speed drive motor and the other wheel of each pair being non-driven; differential means carried by said bridge and having two rotational inputs respectively coupled to said non-driven wheels and having a rotational output; speed control means operatively coupled to said rotational output for adjusting the speed of at least one of said drive motors in accordance with the relative rotation of said non-driven wheels, whereby the speed of one end of the bridge is adjusted to maintain the bridge substantially aligned with its direction of travel on the rails.

6. The invention of claim 5, wherein said non-driven wheels are substantially identical cylinders and freely journaled with respect to the bridge.

7. In combination with a traveling bridge supported on spaced parallel rails by two spaced wheels at each end of the bridge, one wheel at each end being driven by an adjustable-speed drive motor and the other wheel at each end being non-driven, whereby the speeds of the two motors may be adjusted to set the traverse of each end of the bridge at the same speed, said two motors being non-synchronous such that their speeds vary in accordance with their loads and with the power supplied thereto; power supply means for said motors; differential means carried by said bridge and having two rotational inputs respectively coupled to said non-driven wheels and having a rotational output; and speed control means operatively coupled between said rotational output and said power supply means for adjusting the relative powers supplied to said motors to correspond to an overload on one end of the bridge as indicated by the relative rotation of said non-driven wheels, the overload resulting in a skewing of the bridge relative to the rails, and, upon removal of the overload for readjusting the relative speeds of the two ends of the bridge and realigning the bridge with its direction of travel.

* * * * *